United States Patent [19]
Feldman et al.

[11] Patent Number: 5,376,407
[45] Date of Patent: Dec. 27, 1994

[54] BENDABLE CARBON - CARBON COMPOSITE

[75] Inventors: Leslie A. Feldman, El Segundo; Patrick M. Sheaffer, Lawndale, both of Calif.

[73] Assignee: The Aeorspace Corporation, El Segundo, Calif.

[21] Appl. No.: 48,102

[22] Filed: May 7, 1987

[51] Int. Cl.⁵ .................. B05D 3/02; C01B 31/00

[52] U.S. Cl. .................. 427/228; 427/175; 264/29.4

[58] Field of Search .............. 427/175, 228; 264/29.4

Primary Examiner—Peter A. Nelson
Attorney, Agent, or Firm—William J. Burke

[57] ABSTRACT

This invention discloses a method for subjecting a carbon/carbon composite material to strain at high temperature which permits the resulting composite material to be formed into various shapes.

2 Claims, 3 Drawing Sheets

BENDABLE CARBON - CARBON COMPOSITE

STATEMENT OF GOVERNMENT INTEREST

The invention described herein may be manufactured and used by or for the Government of the United States for governmental purposes without the payment of royalty therefor.

BACKGROUND OF THE INVENTION

1. Field of the Invention

This invention relates generally to the field of composite material containing carbon fibers and a carbon matrix.

2. Description of the Prior Art

Typical processes for manufacturing carbon/carbon composites involve either: (1) impregnating layers of pre-impregnated carbon cloth (a lay-up) with pitch and then calcining and graphitizing the product to high temperatures; or (2) impregnating a pre form, or set of yarns woven together in several directions, with pitch and graphitizing at high temperatures. In both cases, the composite produced is frequently given a final machining to achieve the desired shape.

It is therefore an object of the present invention to produce a composite which is flexible and non-brittle at ordinary temperatures and may be easily bent or formed into various shapes.

SUMMARY OF THE INVENTION

Subjecting a carbon/carbon composite material to strain at high temperature creates a specially microcracked structure, which permits the resulting composite material to be bent and shaped into various curves and permits the material to hold such shapes.

DESCRIPTION OF THE PREFERRED EMBODIMENT

Figure 1:
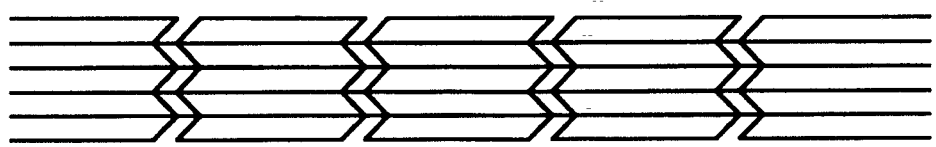
FIG. 1 is a schematic illustration of a composite containing HM3000 fiber and 15 V coal tar pitch after creep at high temperature.

The composite material used in the embodiment of the present invention is a composite produced from yarn and pitch. The present embodiment is produced from Hercules HM3000 carbon yarn and Allied 15 V coal tar pitch. The carbon yarn is Hercules "Magnamite" type, PAN-based, strength 379 GPa (55 Msi), density 1.84 g/cc, filament diameter 8 micrometers, with 3000 filaments per tow. The pitch material, Allied grade 15 V ("Vacuum") carbon pitch, has the following specifications: softening point 90–95 Centigrade, xylene insolubles 14–18%, quinoline insolubles 2–7%, specific gravity 1.26–1.32, ash content 0.25% maximum, distillation 9% maximum to 360 Centigrade.

In the initial processing step, the yarn is passed through a reservoir of molten pitch in the absence of oxygen at 300° C., while the pitch is a fluid of low enough viscosity to permeate the yarn thoroughly. Under the conditions stated here, the 15 V pitch is sufficiently fluid and has the ability to wet the HM3000 yarn so that it is able to impregnate the yarn. The impregnated yarn is then cut to lengths of appropriate size for the high temperature furnace. Before high temperature straining, samples are pre-pyrolyzed at 1000 Centigrade in argon atmosphere. This heating has the effect of allowing most of the volatile by-products of carbonization of the pitch matrix to escape. Eliminating volatiles by-products has several benefits including easier handling and simplified processing. The yarn is then subjected to strain at high temperature (up to 3000° C.) under constant load. The application of the load permanently elongates the composite. This causes growth of cracks in the pitch matrix, narrowing of the carbon fibers, and weakening of the fiber-matrix bond. The microstructural changes caused by this are described below.

The resulting composite exhibits certain unusual properties after being subjected to strain at high temperature. Although the sample is rigid on removal from the furnace after cooling down after high temperature straining, it is not brittle and is capable of sustaining large deformation. It may be bent carefully by hand to a radius of approximately 1 inch, and can then be straightened out again by bending back. This causes no visible damage to the sample, even after several bending and straightening cycles. It remains relatively stiff and can support its own weight.

Figure 2:
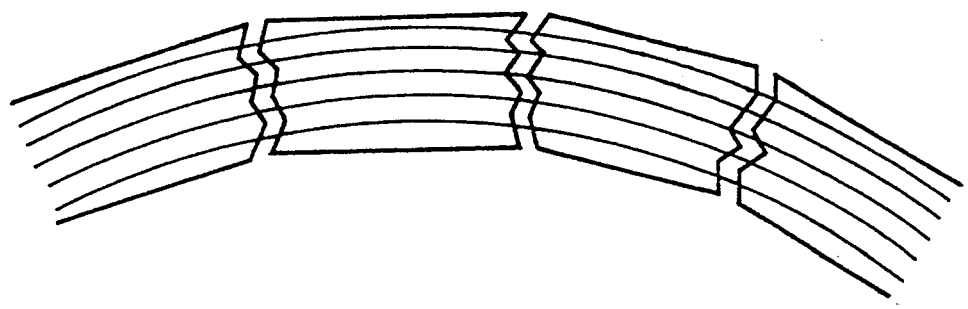
FIG. 2 is a schematic illustrating the compressive and tensile stresses in a smoothly bent composite.

Microstructural features of the sample observed under the optical microscope explain the behavior of the composite. Referring to FIG. 1, the matrix contains a series of regularly spaced cracks through which the carbon filaments pass. The structure is analogous to beads on strings. When the sample is bent, the filaments slide inside the beads of matrix. As there is some shear strength, or at least appreciable sliding friction at the interface between filament and matrix, the sample holds its shape. FIG. 2 shows schematically the structure of a smoothly bent composite. The matrix cracks, or spaces between the beads, assume a wedge shape as the sample bends. It seems likely that the hot stretching at high temperature increases the fine segmentation of the matrix and increases the crack width. Close spacing of the matrix cracks gives smooth bending.

The stresses in the composite during bending are generally indicated in FIG. 2. The filaments under compression do not appear to undergo buckling, which indicates that the compressive stresses generated by sliding friction between filament and matrix remain sufficiently low.

Figure 3:
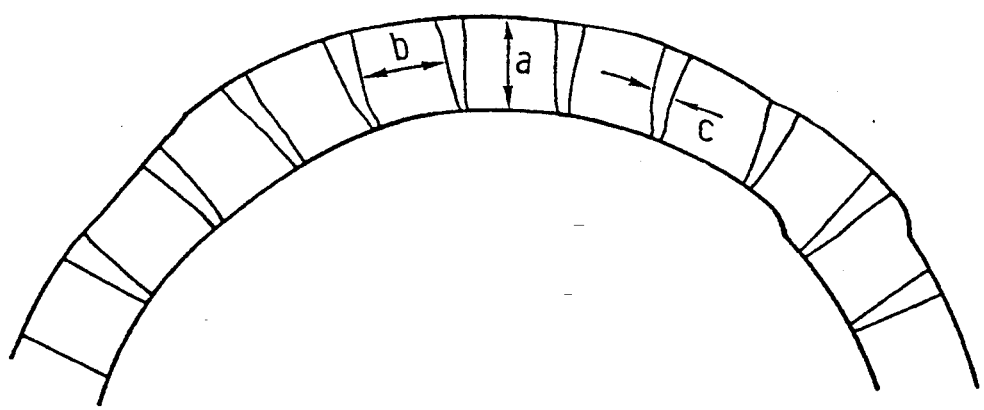
FIG. 3 is a schematic illustrating an example of the bending geometry.

A simple example of the bending geometry is indicated in FIG. 3. For example, for regularly spaced matrix beads of diameter a, length b and original crack width c, the final radius after bending is:

$$R \approx \frac{ab}{2c}.$$

For the embodiment described above, a=1 mm, b=0.31 mm, c=0.0046 mm, and R=34 mm.

Several possible applications for a material with these properties are readily apparent. The bendable carbon/carbon yarn may be bent into any desired shape to form a larger composite with some desired contour. Then the entire assembly of bendable yarns may be again impregnated with pitch and processed to form a rigid composite again, whose reinforcing filaments can follow almost any desired curve. It may also be useful in forming curved, multifilament heating elements, as well as in many other applications.

While the preferred embodiment of the present invention has been described and illustrated in terms of HM3000 fiber and 15 V coal tar pitch, one skilled in the art will understand that the invention is not limited to the precise construction disclosed herein. For example, a fiber made from pitch would provide increased stiffness while a fiber made from polyacrylonitrile (PAN) would increase strength. The right is reserved to all changes and modifications coming within the scope of the invention as defined in the appended claims.

We claim:

1. A method of manufacturing bendable carbon/carbon composites comprising the steps of:
   passing a PAN-type carbon fiber yarn through molten pitch in the absence of oxygen at 300 degrees Centigrade thereby impregnating the body of the yarn with the pitch;
   pyrolyzing the impregnated yarn; and
   heating the impregnated yarn under a load at a temperature of up to 3000 degrees Centigrade in an argon gas atmosphere thereby creating cracks in the pitch matrix.

2. The method claimed in claim 1 wherein the yarn is Hercules HM3000 and the pitch is Allied 15 V.

* * * * *